United States Patent [19]
Heger

[11] Patent Number: 5,594,669
[45] Date of Patent: Jan. 14, 1997

[54] ELECTRONIC FENCE POST LEVEL

[75] Inventor: Charles E. Heger, Saratoga, Calif.

[73] Assignee: Zircon Corporation, Campbell, Calif.

[21] Appl. No.: 277,060

[22] Filed: Jul. 19, 1994

[51] Int. Cl.⁶ .................................................. G01C 9/06
[52] U.S. Cl. ................................ 364/559; 33/366; 33/343
[58] Field of Search ............................ 364/559; 340/552; 33/379, 372, 371, 451, 366; 219/121.78

[56] References Cited

U.S. PATENT DOCUMENTS

| | | | |
|---|---|---|---|
| 4,912,662 | 3/1990 | Butler et al. | 364/559 |
| 4,976,040 | 12/1990 | Mish et al. | 33/372 |
| 5,083,383 | 1/1992 | Heger | 33/366 |
| 5,136,784 | 8/1992 | Marantz | 33/366 |
| 5,207,004 | 5/1993 | Gruetzmacher | 33/379 |
| 5,259,118 | 11/1993 | Heger | 33/366 |
| 5,313,713 | 5/1994 | Heger et al. | 33/366 |
| 5,479,715 | 1/1996 | Schultheis et al. | 33/366 |

FOREIGN PATENT DOCUMENTS

| | | |
|---|---|---|
| 2214643 | 9/1989 | United Kingdom . |
| WO88/00329 | 1/1988 | WIPO . |
| WO94/04888 | 3/1994 | WIPO . |

*Primary Examiner*—Emanuel T. Voeltz
*Assistant Examiner*—Demetra R. Smith
*Attorney, Agent, or Firm*—Skjerven, Morrill, MacPherson, Franklin & Friel; Norman R. Klivans

[57] ABSTRACT

An electronic level for leveling a fence post or other vertical member includes two inclination sensors mounted orthogonally. The sensors measure inclination in each of two orthogonal planes. The output of the sensors is displayed by two scales which intersect at a central point. Each scale includes a number of triangular shaped segments arranged along a line. Each of the two scales depicts inclination in a plane determined by its associated sensor; when the fence post is at the vertical position the display so indicates by illuminating a central display point at the intersection. Otherwise the illuminated triangular shaped arrowhead for each scale indicates in which direction the worker is to move the fence post in each of the two corresponding dimensions so as to achieve verticality.

12 Claims, 3 Drawing Sheets

ELECTRONIC FENCE POST LEVEL

BACKGROUND OF THE INVENTION

1. Field of the Invention

This invention relates to an electronic level, and specifically to the visual display of such a level suitable for leveling a vertical member such as a fence post or a pole.

2. Description of the Prior Art

Electronic levels such as that sold by Wedge Innovations, Inc. and as disclosed in U.S. Pat. No. 4,912,662 issued Mar. 27, 1990 to Butler, et al., are known in the art. Additional prior art levels are disclosed in U.S. Pat. No. 5,259,188 issued Nov. 9, 1993 to Charles E. Heger using a capacitive level sensing system disclosed in U.S. Pat. No. 5,083,383 to Charles E. Heger, U.S. Pat. No. 5,313,713 issued May 24, 1994 to Charles E. Heger et al., and International (PCT) Patent Application Document No. U.S. Ser. No. 93/07434 having International Publication No. W094/048888 published Mar. 3, 1994 entitled "Electronic Level . . . " invented by Charles E. Heger, et al. These patent disclosures are incorporated herein by reference.

These electronic levels are intended for the typical situation of leveling (or plumbing) a member such as a board during construction. A different type of well known non-electronic level is the fence post or "bullseye" level. This non-electronic "bubble" level has a dome shape for the bubble enclosure. The bubble may move to any position (through 360° and at varying radii) inside the transparent dome, and the bubble position is indicated by a set of cross-hairs and/or concentric circles on the top of the dome. This device is used for "plumbing" a vertical member such as a fence post or a flag pole. In this case, the "leveling" process is done in two dimensions, not just one as for the typical level.

Such bullseye levels are difficult to use, since the direction in which the member (fencepost) must be moved is not intuitively apparent from the bubble position. Thus use of such a device requires a great deal of a trial-and-error due to the need to move the member in two dimensions to achieve the desired null position (verticality, also called plumb).

Further, such prior art devices suffer from the typical drawbacks of non-electronic levels. That is, not readily calibrated by the user; difficult to read in poor light conditions; may not provide the required degree of precision; and provide only a visual, not an audible, indication.

There is a need for an improved fence post level providing a readily understandable display and an indication not only of the vertical (plumb) position but also in which direction(s) the member (fence post) should be moved to achieve the vertical position.

SUMMARY OF THE INVENTION

An electronic fence post level includes two independent inclination sensors arranged in orthogonal planes. Each sensor is independent with respect to rotation by the other sensor in an orthogonal plane. The level housing defines an angular indentation (such as at a right angle), with one sensor arranged along (or parallel to) each side of the angle. In one exemplary embodiment, each sensor is a two electrode plate capacitive sensor connected via display processing circuitry to an LCD display. The display includes two intersecting scales, and deviation from vertical in each plane of the device is displayed on respectively one of the two scales.

When the level is in use, the housing indentation is applied against a corner of the fence post. The fence post is then moved in each of the two direction(s) indicated by the two scales until the vertical position is reached. The two scales thereby provide an indication in two dimensions how the fence post is to be moved. This directionality is enhanced because each scale includes, instead of ordinary illuminated linear segments, a number of small arrowhead-type (triangular) segments pointing in the direction in which the fence post should be moved to achieve the vertical position. At the center of the display, where the two scales intersect, the intersecting arrowheads of the two scales form a circle indicating the desired vertical position. The circle is thereby illuminated when the level is in the vertical position.

Thus an easily understood and graphical depiction is provided of how the fence post should be moved to achieve verticality, the depiction being in two independently displayed dimensions. An associated audible tone or tones is also provided in one embodiment to indicate both deviation from verticality, and also when verticality is achieved.

DETAILED DESCRIPTION OF THE INVENTION

Figure 1A:
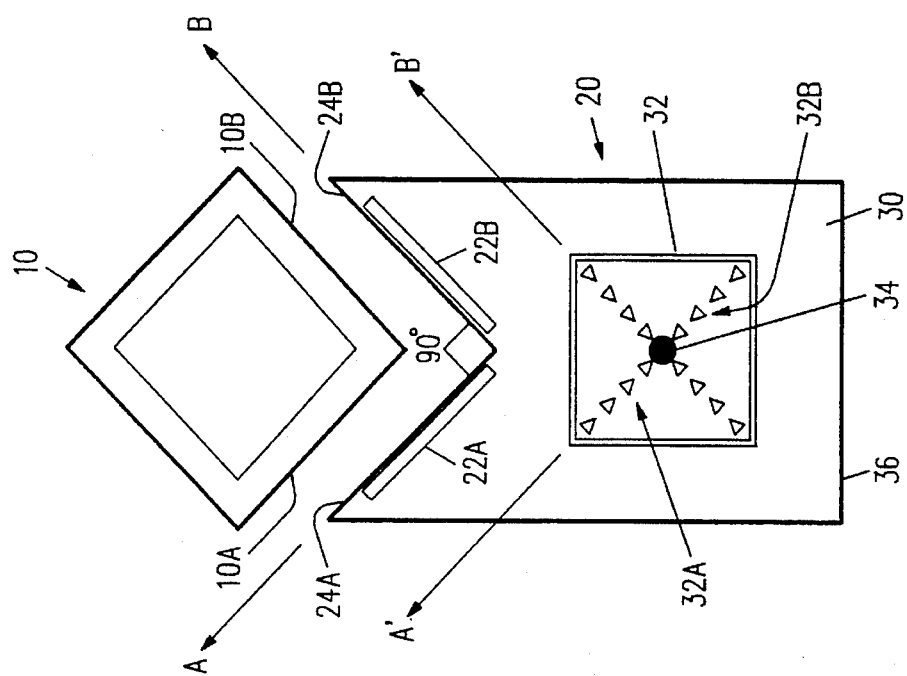
FIG. 1A is a perspective view of a fence post level in use in accordance with the invention.

FIG. 1A illustrates a fence post level in accordance with the present invention, in use. It is to be appreciated that this illustration of the level structure is explanatory rather than literal.

The work piece 10 is a fence post or other vertical member such as a board, flag pole, etc. In this case member 10 is rectangular in cross section, having two intersecting planar surfaces 10A and 10B as is typical of a fence post. However, it is to be understood that a level in accordance with the present invention is usable with work pieces having other cross-sectional shapes such as a circle, oval, etc. or even a planar surface having an edge; the level is applied to any convenient outer surface of the member, and typically held there by a strap, clamp, etc. (not shown) or by hand.

The housing of level 20 includes two walls 24A and 24B having outer planar surfaces intersecting at 90° as shown. Walls 24A, 24B thereby define an indentation or angular structure in the level 20 housing and defining respectively planes A and B, which fits against the corresponding surfaces 10A and 10B of the work piece 10. Located on the inner side of respectively walls 24A and 24B, i.e. inside the level 20 housing (the remainder of the housing itself is not shown in this figure) are two sensors 22A and 22B. In one embodiment these are capacitive type sensors; other types of known sensors are also capable of providing the electric signals indicating inclination. Sensors 22A and 22B are shown here diagrammatically (without detail).

Sensors 22A and 22B each measure deviation in inclination from null, the null being defined in this case as being the vertical direction i.e. to the upper portion of the figure. The directions of inclination measured in planes A and B are shown respectively by inclination arrows 26A and 26B. (Arrows 26A and 26B are only illustrative of the inclination sensing capabilities of sensors 22A and 22B and are not structural elements.) Thus, movement of level 20 as it is held against work piece 10 in the plane A defined by wall 24A provides an inclination signal from sensor 22A indicating deviation from vertical as shown by arrow 26A. Similarly, movement of the work piece 10 in the plane B defined by wall 24B provides an inclination signal from sensor 22B indicating deviation from vertical as shown by arrow 26B.

Sensor 22A and sensor 22B are both coupled, by two channel electronic circuitry described in more detail below, to level display 32 which is located on an outer surface 30 of the housing of level 20. In the actual level, only the display 32 is visible to the user; sensors 22A, 22B are interior components not visible to the user. Display 32 includes two intersecting scales 32A and 32B. Scale 32A is associated with sensor 22A, and scale 32B is associated with sensor 22B. Each scale 32A, 32B includes nine segments, in this embodiment eight small triangles and a central segment of two small triangles arranged point-to-point, arranged linearly and pointing to a central point 34.

Thus scale 32A, showing inclination of sensor 22A, shows inclination in the plane A of FIG. 1A; similarly scale 32B, coupled to sensor 22b shows inclination in the plane B of FIG. 1A.

Figure 1B:
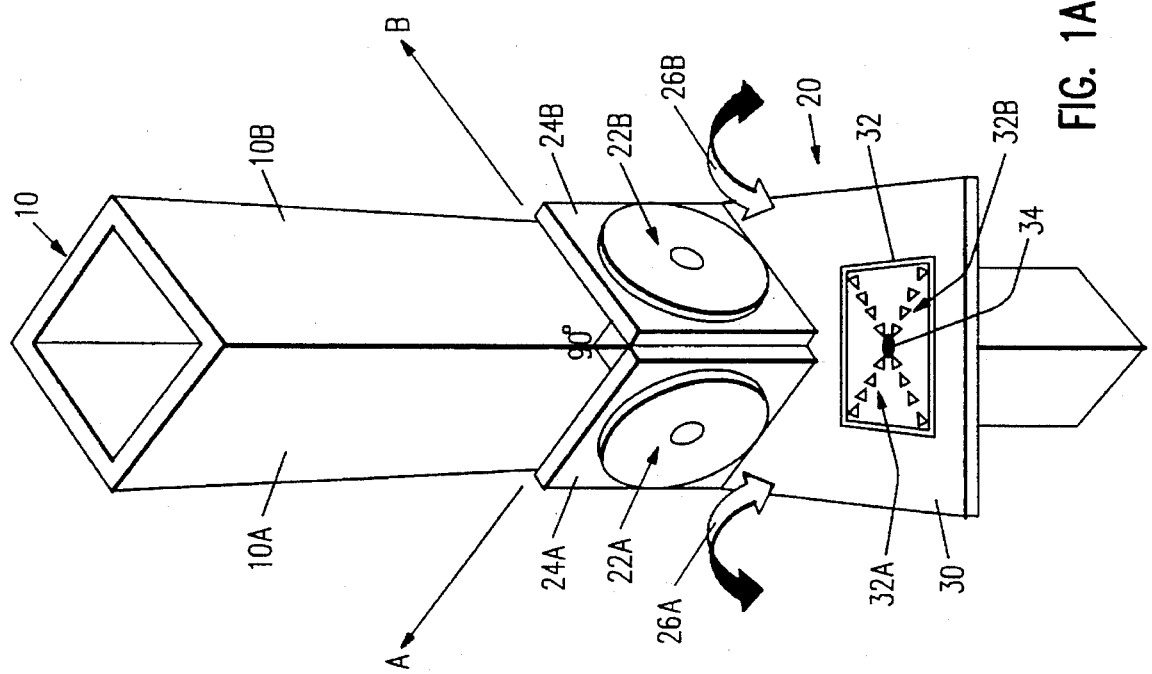
FIG. 1B is a plan view of the use of the level device of FIG. 1A.

A top (plan) view of the work piece 10 and level 20 are shown in FIG. 1B; in this case a slight separation between the work piece 10 and level 20 is shown for purposes of illustration; it is to be understood that in actual use, the outer surfaces of walls 24A and 24B are held against respectively surfaces 10A and 10B. In FIG. 1B, scales 32A and 32B are shown having axes A' and B', not necessarily corresponding to the angle between planes A and B. The remainder 36 of the level housing 36 is shown in FIG. 1B.

Display 32 typically is an LCD display; however, other displays such as LED or simple independently illuminated segment displays are also suitable for this application. Since display 32 is an LCD display, the "illuminated" (on) segments are darker than the others; this would not be the case with other types of displays.

Figure 2:
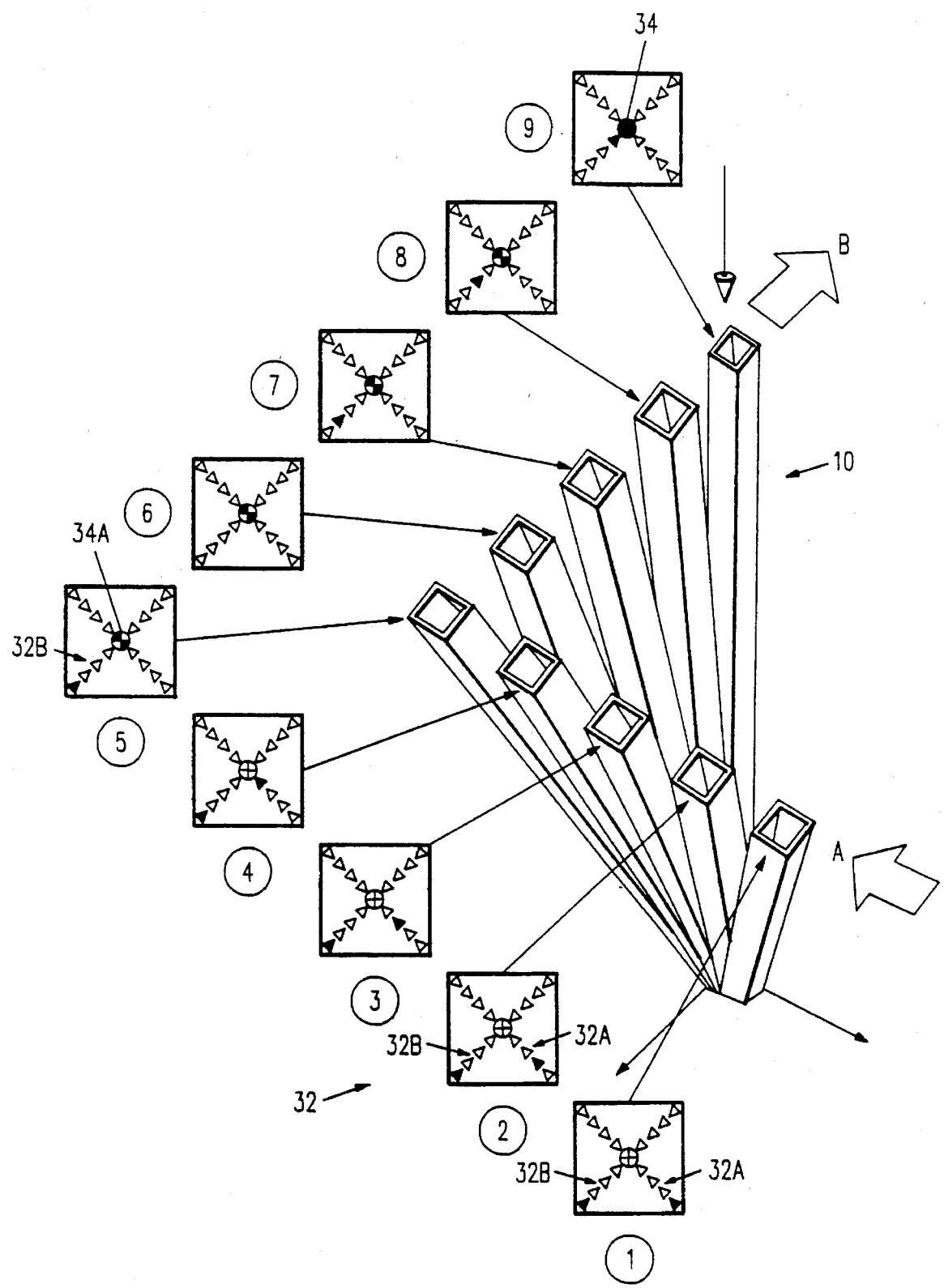
FIG. 2 depicts graphically a process for leveling a fence post, and the associated level displays, in accordance with the invention.

FIG. 2 illustrates more graphically use of the level 20, showing for various positions of the work piece (fence post) 10 the corresponding level display 32. The various level displays 32 are numbered for convenience 1 to 9 and correspond, as shown by the connecting arrows, to corresponding positions of the fence post 10. (It is to be understood that in this case the actual level is not shown, but merely the display.) Thus starting at position 1, the fence post 10 is tilted away from the vertical position in two dimensions as shown by the illuminated (dark) segments of the corresponding display 1. Thus, the segments at the ends of the two scales are illuminated showing deviation in both dimensions from vertical.

In position 2, the user has begun to move the fence post 10 in the direction defined by display scale 32A. Thus in display number 2 on scale 32A the second segment is illuminated. As can be seen, the arrow head shaped segments of displays 32A and 32B provide guidance as to which direction the fence post is to be moved to achieve the central position. Then as shown in display 3, further movement of the fence post illuminates a segment closer to the center of scale 32A. Note that the segment at the end of scale 32B in this case is still illuminated, indicating the maximum out of vertical position in this plane. This is because no movement of fence post 10 has yet taken place along the axis defined by scale 32B. In position 4, further movement of the fence post results in the illuminated segment of scale 32A being that segment one short of the central position. Then at display 5, the fence post has been leveled along the first axis so that the central segment at location 34A of scale 32A is illuminated. However, along the other axis defined by scale 32B, the end segment is illuminated, indicating maximum deviation from vertical along this axis.

At this time the user, understanding that he has plumbed the fence post along the first axis as indicated by display 32 at position 5, begins to level the fence post along the second axis by moving the fence post so as to achieve the central position 34 along the axis defined by scale 32B. Thus as shown in positions 6, 7 and 8 he incrementally moves the fence post along the axis of scale 32B, getting closer and closer to the central point 34, until at position 9 he has actually achieved the vertical indication (as shown conceptually by the illustrated plumb device), and the central portion 34 of the display is illuminated in all four of its arrowhead quadrants, forming a circle indicative of verticality. In one embodiment, an audible tone is then provided. Thus the "leveling" process is complete, without fumbling or confusion by the user, by using the unambiguous indications supplied by the display of which direction to move the fence post at any instant.

In another embodiment, provision of the audio tones is similar to that described in U.S. Pat. No. 5,313,713, with one tone being associated with each segment of e.g. scale 32A. The identical tones are used for scale 32B; hence the tones are not specifically identifiable with either scale.

The electronics portion of this level may take several forms. Electronic levels, including sensors and processing circuitry, are well known in the art as described in the above referenced patent disclosures. The level in accordance with the present invention may include many of the structural and electronic features disclosed therein.

Figure 3:
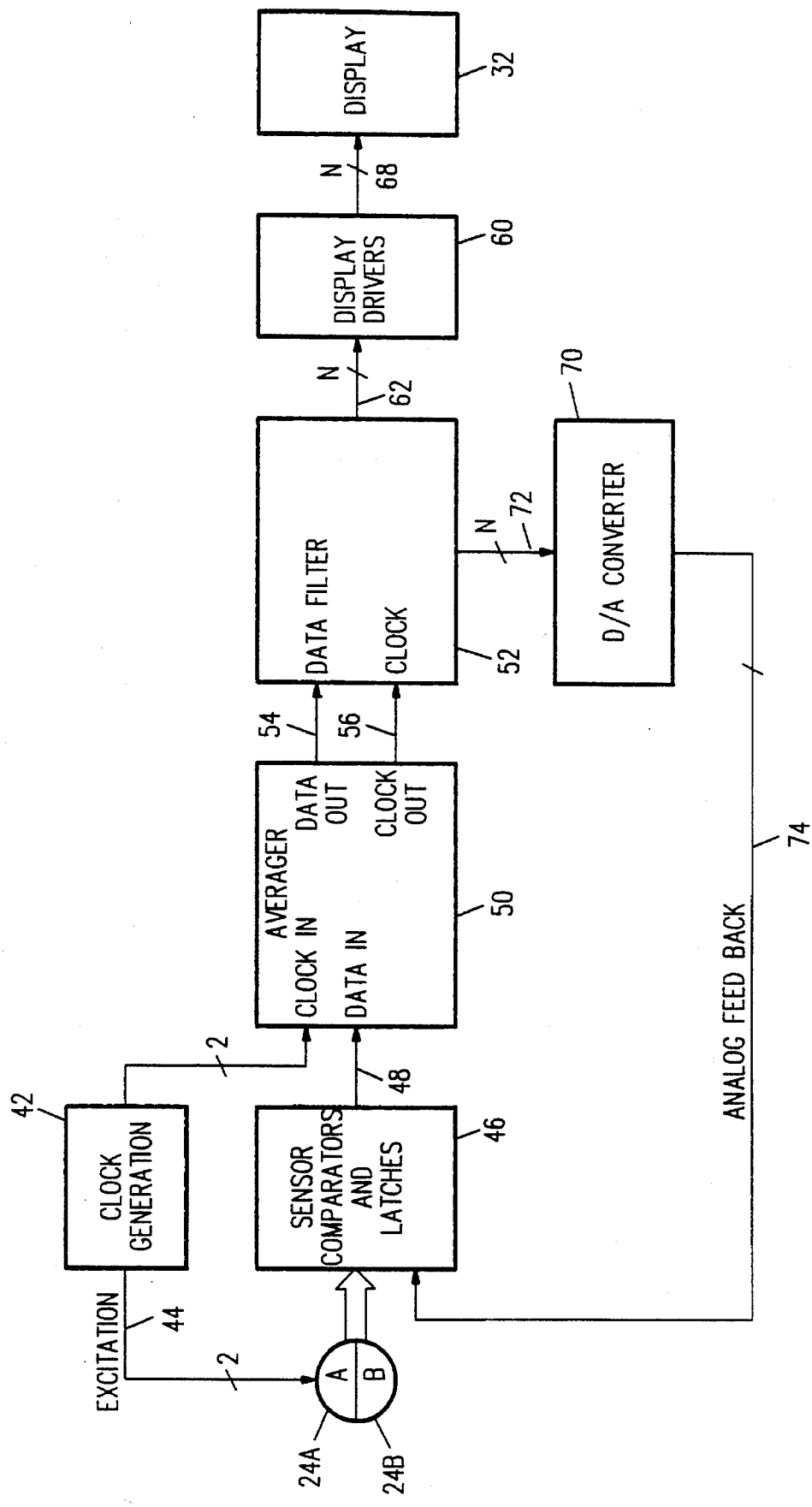
FIG. 3 is a block diagram of electronic circuitry of a level in accordance with the present invention.

One embodiment of the electronics portion of the level is shown in FIG. 3. Two sensors 24A and 24B are as shown in FIG. 1A. Each sensor includes two sensor electrode plates of the type disclosed in the sensor in U.S. Pat. No. 5,313,713 incorporated by reference above, except that here each plate is semicircular. Alternatively, one could also use the "lower" two electrodes of a four electrode sensor as in U.S. Pat. No. 5,313,713, without utilizing the "top" two. Each sensor 24A, 24B has its own signal processing channel (only one channel of which is shown here). The circuitry for each channel is identical. The output signals of sensors 24A and 24B are provided to sensor comparators and latches 46, of the type described in U.S. Pat. No. 5,313,713. The output signal of the sensor comparators and latches 46 is provided on line 48 to averager circuitry 50 at its Data In terminal. Averager 50 processes the sensor data as described in the above-mentioned U.S. Pat. No. 5,313,713. Also provided is a clock signal to the Clock In terminal of averager 50. The Data Out signal, i.e. the signal indicating the average inclination for one of the two sensor channels, is provided on line 54 to the data filter circuitry 52 which also receives a clock signal from the averager circuitry 50. One embodiment of the data filter circuitry 52 is described in U.S. Pat. No. 5,313,713 and an additional embodiment is further described, together with a moving average filter technique, in commonly owned U.S. patent application Ser. No. 08/277,058, filed Jul. 19, 1994, now U.S. Pat. No. 5,479,715, issued Jan. 2, 1996 entitled "Electronic Level Displaying Inclination Using A Multi-Segment Fan-Like Display" invented by Gary R. Schultheis, et al., incorporated herein by reference. This "Moving Average Filter" is included in the display processing to further reduce system mechanical noise due to small movements in the level caused by the user, and operates as follows.

Increasing the number of averaged sensor excitation cycles would reduce this noise, but at the expense of reduced throughput or slower response time. Adding a digital filter while retaining the number of averaged sensor cycles advantageously does not slow the level response, other than an initial time lag to recognize level rotation that exists longer than two average cycles.

The moving average filter averages (takes the mean of) the last four DAC 70 (digital to analog converter) codes (the current and most recent last three digital values) with the result of this average controlling whether the display value is incremented clockwise, counter clockwise or held in the current state.

Given the single bit data output signal of the averager 50 to be a(n), the DAC code d(n) is updated as follows:

$$d(n)=d(n-1)+1 \text{ if } a(n)=1 \quad d(n-1)-1 \text{ if } a(n)=0 \qquad (1)$$

That is, the DAC in block 70 is incremented by one if the average result is one and decremented by one if the average result is zero.

This is equivalent to:

$$d(n)=d(n-1)+2a(n)-1 \qquad (2)$$

Averaging the last four DAC codes gives:

$$f(n) = \frac{d(n) + d(n-1) + d(n-2) + d(n-3)}{4} \qquad (3)$$

From Equations (1) and (2):

$$d(n-1)=d(n)-2a(n)+1 \qquad (4)$$

$$d(n-2)=d(n)-2a(n)-2a(n-1)+2 \qquad (5)$$

$$d(n-3)=d(n)-2a(n)-2a(n-1)-2a(n-2)+3 \qquad (6)$$

Substituting (4), (5), and (6) into (3):

$$f(n) = d(n) + \frac{\overline{3a(n)} - 2a(n-1) - a(n-2)}{2} \qquad (7)$$

This formula can be implemented in a conventional microprocessor/controller by a computer program operating as described herein or in logic circuitry.

The alternate logic circuitry implementation uses a two bit subtractor with a three bit result (carry, , $S^1$, $S^0$), dropping the LSB (least significant bit $S^0$) of the subtractor output to divide by 2 and adding the result to d(n) in an N bit adder. The LSB ($S^0$) of the output of the subtractor is then used, via an N-bit set of flip-flops, to either retain the previous display position (where $S^0$=0) or use the new result $S^N$ from the output of the adder (where $S^0$=1) as the output signal. This circuitry is readily embodied in a computer program by one skilled in the art. For the logic circuit implementation, the moving average filter circuit is part of data filter 52 of FIG. 3.

The output signals of the data filter 62 are provided on lines 62, in this case including N lines where N is equal to 9 (corresponding to the nine display segments of each plane) to display drivers circuitry 60 which in turn, via lines 68, drives the conventional LCD display 32. The output signals are also used conventionally to generate the audible tone or tones (not shown) via a loudspeaker.

Also shown are Digital to Analog Converters 70, which receive the data information from data filter 52 via lines 72 and provide an analog signal on feedback lines 74 back to the input terminals of sensor comparators 46. This feedback is for purposes of calibration, as disclosed in U.S. Pat. No. 5,313,713.

Also provided is a clock generator 42 which provides clock signals to averager 50 and also provides excitation pulses to sensors 24A and 24B, also as disclosed in U.S. Pat. No. 5,313,713.

It is to be appreciated that the block diagram of FIG. 3 is a high level block diagram; for further detail reference is made to the above-mentioned patent disclosures. It is to be understood that the level includes a microprocessor (not shown) for control purposes. It is also to be understood that this circuitry is not limiting but is for one embodiment of a level in accordance with the present invention. Another suitable embodiment (describing only one channel of the processing circuitry) is shown in the above-mentioned patent "Electronic Level Displaying Inclination Using a Multi-Segment Fan-Like Display".

Further, a level in accordance with the invention may include functions such as a calibration function and indication, user and fixed offset modes, and other user indications such as a low battery or tone generator status, as described e.g. in U.S. Pat. No. 5,713,313.

It is desirable for accuracy to have a level (or plumb) indication having a rather small "window" (e.g., 2 arc minutes), but at the same time, have an overall display range wide enough to be easily used. A nine segment display would correspond, given equal sized processing "bins" as in U.S. Pat. No. 5,313,713, to a 14 arc minute display range which is very difficult to use in actual practice as being too narrow.

By increasing the number of "bins" and combining certain bins to enable certain display segments, a weighted, or non-linear display is achieved that desirably retains a narrow center window while giving a larger end-to-end overall range.

For example, when seventeen processor "bins" as described in U.S. Pat. No. 5,313,713 are combined into e.g. nine bins the end-to-end range may be e.g. 30 arc minutes, while keeping a narrow center window of 2 arc minutes. The result is a doubling of display range while retaining accuracy (a narrow window) where it is required, at the center bin. The resulting display 32 of FIG. 1A has fewer display segments than processing bins, with an attendant increase in ease of use and user interpretation.

This disclosure is illustrative and not limiting; further modifications will be apparent to one skilled in the art in light of this disclosure, and the invention herein is limited only by the appended claims.

I claim:

1. A device for sensing inclination of an elongated member defining a longitudinal axis, comprising:

a support defining an indentation, the indentation being adapted to contact the member;

a first inclination sensor mounted on the support and arranged for sensing inclination in a first plane parallel to the longitudinal axis of the member and generating a first electrical signal indicative of the sensed inclination of the first sensor;

a second inclination sensor mounted on the support and arranged for sensing inclination in a second plane orthogonal to the first plane and parallel to the longitudinal axis of the member, and generating a second electrical signal indicative of the sensed inclination of the second sensor; and a display operatively connected to the first and second sensors, indicating the sensed inclinations, the display including a first and a second scale each including a plurality of segments and the first scale being associated only with inclination in the first plane and the second scale being associated only with inclination in the second plane, the first and second scales intersecting on the display.

2. The device of claim 1, wherein at least some of the segments are triangles in shape, the triangles being arranged to point to the intersection of the first and second scales, thereby to point to a direction in which the elongated member is to be moved in order to achieve a vertical position.

3. The device of claim 1, wherein at the intersection of the first and second scales, two segments of the first scale and two segments of the second scale together define a circle.

4. The device of claim 3, wherein the two segments of the first and second scales at the intersection each are two triangles arranged point-to-point, four such triangles defining the circle.

5. The device of claim 1, wherein except when the intersection of the first and second scales is illuminated only one segment of the first scale is illuminated by the first electrical signal for each of a plurality of predetermined increments of inclination of the device in the first plane, and only one segment of the second scale is illuminated by the second electrical signal for each of a plurality of predetermined increments of inclination of the device in the second plane.

6. The device of claim 1, wherein the support is a housing defining the indentation, the indentation being adapted to contact two surfaces of the member.

7. The device of claim 6, wherein the indentation defines a right angle and the first and second scales are arranged so that the first scale extends along a first side of the right angle and the second scale extends along a second side of the right angle.

8. The device of claim 1, wherein at the intersection of the first and second scales, two opposing segments of the first scale and two opposing segments of the second scale together define a closed figure.

9. A method of indicating an inclination of a member defining a longitudinal axis, comprising the steps of:

applying an instrument defining an angular indentation to the member;

sensing a first amount of an inclination of the member in a first plane parallel to the longitudinal axis, and generating a first electrical signal indicative of the first amount of inclination;

independently sensing a second amount of inclination of the member in a second plane orthogonal to the first plane, and generating a second electrical signal indicative of the second amount of inclination; and displaying the first electrical signal on a first scale and the second electrical signal on a second scale, the first and second scales intersecting;

thereby providing a two-dimensional indication of the inclination of the member.

10. The method of claim 9, further comprising, when the member is parallel to a direction of the earth's gravitational field, displaying a circular center point at the intersection of the first and second scales, the circular center point including segments of both the first and second scales.

11. The method of claim 9, further comprising the steps of:

removably placing a device defining an indentation in its outer surface against the member, the indentation being applied to the member.

12. The method of claim 9, wherein the first scale extends along a first side of the indentation and the second scale extends along a second side of the indentation.

* * * * *